(12) United States Patent
Lee et al.

(10) Patent No.: US 7,350,930 B2
(45) Date of Patent: Apr. 1, 2008

(54) ILLUMINATING UNIT WITH REFLECTIVE COLLIMATOR AND IMAGE PROJECTION SYSTEM INCLUDING THE SAME

(75) Inventors: Kye-hoon Lee, Suwon-si (KR); Dae-sik Kim, Suwon-si (KR); Su-gun Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 11/216,129

(22) Filed: Sep. 1, 2005

(65) Prior Publication Data
US 2006/0104065 A1 May 18, 2006

(30) Foreign Application Priority Data
Nov. 17, 2004 (KR) .................. 10-2004-0094193

(51) Int. Cl.
*G03B 21/28* (2006.01)
(52) U.S. Cl. ................... 353/98; 362/555; 362/800; 362/307
(58) Field of Classification Search .......... 353/98, 353/99; 362/612, 555, 84, 800, 26, 560, 362/296, 307, 341; 349/61, 62; 313/512, 313/498
See application file for complete search history.

(56) References Cited

U.S. PATENT DOCUMENTS

| 6,547,423 | B2* | 4/2003 | Marshall et al. ............ 362/333 |
| 6,560,038 | B1* | 5/2003 | Parkyn, Jr. et al. ......... 359/726 |
| 7,040,767 | B2* | 5/2006 | Lee et al. .................... 353/99 |
| 7,097,334 | B2* | 8/2006 | Ishida et al. ................ 362/516 |
| 7,182,497 | B2* | 2/2007 | Lee et al. .................... 362/555 |
| 2004/0207999 | A1* | 10/2004 | Suehiro et al. ............. 362/84 |
| 2004/0223315 | A1* | 11/2004 | Suehiro et al. ............. 362/84 |
| 2005/0018147 | A1* | 1/2005 | Lee et al. .................... 353/98 |
| 2005/0204448 | A1* | 9/2005 | Wise et al. .................. 2/69 |
| 2006/0152688 | A1* | 7/2006 | Chen et al. .................. 353/98 |

FOREIGN PATENT DOCUMENTS

| CN | 1418323 A | 5/2003 |
| JP | 07-202270 | 4/1995 |
| JP | 08-162673 | 6/1996 |
| JP | 09-097927 | 4/1997 |
| JP | 11-167005 | 6/1999 |
| JP | 2000-216436 | 8/2000 |
| JP | 2003-215313 | 7/2003 |
| JP | 2004-104077 | 4/2004 |
| WO | WO 01/14791 A1 | 3/2001 |

OTHER PUBLICATIONS

Chinese Office Action dated Mar. 23, 2007 issued in CN 2005100907166.

* cited by examiner

*Primary Examiner*—William C. Dowling
(74) *Attorney, Agent, or Firm*—Stanzione & Kim, LLP

(57) ABSTRACT

An illuminating unit includes a reflector including a parabolic reflecting surface and an incident portion and an exit portion intersecting with each other a light source to emit a beam onto the reflecting surface through the incident portion, a light source deviation compensator disposed between the reflector and the light source to focus an image of the light source is focused to a focal point of the reflecting surface, and a light path changer to direct at least a portion of a beam with a radiation angle less than an angle of the exit portion toward the reflecting surface.

22 Claims, 4 Drawing Sheets

ILLUMINATING UNIT WITH REFLECTIVE COLLIMATOR AND IMAGE PROJECTION SYSTEM INCLUDING THE SAME

CROSS-REFERENCE TO RELATED APPLICATIONS

This application claims the priority under 35 U.S.C. §119 of Korean Patent Application No. 2004-94193, filed on Nov. 17, 2004, in the Korean Intellectual Property Office, the disclosure of which is incorporated herein in its entirety by reference.

BACKGROUND OF THE INVENTION

1. Field of the Invention

The present general inventive concept relates to an illuminating unit to emit a collimated beam and an image projection system including the same.

2. Description of the Related Art

An illuminating unit employs various types of collimators including lenses to efficiently collimate a beam from a light source to a beam at a radiation angle to effectively illuminate an object.

For example, an image projection system may include an illuminating unit illuminating a light modulator. When a large, bulky metal halide lamp or an ultrahigh-pressure mercury lamp is used as a light source in the illuminating unit, the illuminating unit becomes bulky. Furthermore, the lamp has a short life span lasting only up to several thousand hours and requires frequent replacement when it is used at home. To solve this problem, research into use of a compact light source such as a longer-lasting light emitting diode (LED) is currently being conducted.

Since an LED typically has a smaller amount of light than the metal halide or ultrahigh-pressure mercury lamp, an LED array of a plurality of LEDs is used as a light source in an image projection system. In this case, a lens is typically used to condense light emitted by the LED array. However, use of the lens degrades optical efficiency.

The degradation of optical efficiency will now be described in more detail with reference to FIGS. 1 and 2. The product of the size and angle of an image at a paraxial region is conserved. Thus, the product of a light-emitting area of an LED multiplied by a solid angle of a light emitting angle becomes the amount of conservation, which is referred to as "etendue." As shown in FIG. 1, when a single LED is used in a conventional image projection system, the product of a light-emitting area $\phi_L$ of the LED multiplied by a solid angle $U_L$ is made equal to the product of the area $\phi_P$ and a solid angle $U_P$ of an optical modulator.

When an array of a plurality of LEDs are used in a conventional image projection system as shown in FIG. 2, the sum $\Sigma\phi_L$ of light-emitting areas for the LED array is greater than the light-emitting area $\phi_L$ of the single LED while a solid angle $U_L$ of a light emitting angle of the LED array and the area $\phi_P$ of a light modulator are equal to their counterparts for the single LED. Thus, to conserve etendue, a solid angle $U_P'$ of a light emitting angle of an optical modulator increases compared to when a single LED is used. Since the solid angle $U_P'$ is greater than an angle $U_P$ that light can effectively be projected by a projection lens, light in a range of an angle greater than the angle $U_P$ cannot be effectively projected by the projection lens. This results in optical losses, thereby degrading optical efficiency. Consequently, while having the increased number of LEDs, the brightness of a conventional image projection system can only be increased to a limited degree.

SUMMARY OF THE INVENTION

The present general inventive concept provides an illuminating unit to efficiently collimate a beam from a light source and an image projection system including the same.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing an illuminating unit including a reflector having a parabolic reflecting surface and an incident portion and an exit portion intersecting with each other, a light source to emit a beam onto the reflecting surface through the incident portion, a light source deviation compensator disposed between the reflector and the light source to focus an image of the light source to a focal point of the reflecting surface, and a light path changer to direct at least a portion of a beam with a radiation angle less than an angle of the exit portion toward the reflecting surface.

The foregoing and/or other aspects of the present general inventive concept are also achieved by providing an image projection system including a plurality of illuminating units to emit a plurality of beams, a light modulator to sequentially modulate the plurality of beams emitted from the plurality of illuminating units according to image data, and a projection lens unit to enlarge and project the plurality of beams radiating from the light modulator. Each of the plurality of illuminating units includes a reflector having a parabolic reflecting surface and an incident portion and an exit portion intersecting with each other, a light source to emit a beam onto the reflecting surface through the incident portion, a light source deviation compensator disposed between the reflector and the light source to focus an image of the light source to a focal point of the reflecting surface, and a light path changer to direct at least a portion of a beam with a radiation angle less than an angle of the exit portion toward the reflecting surface.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
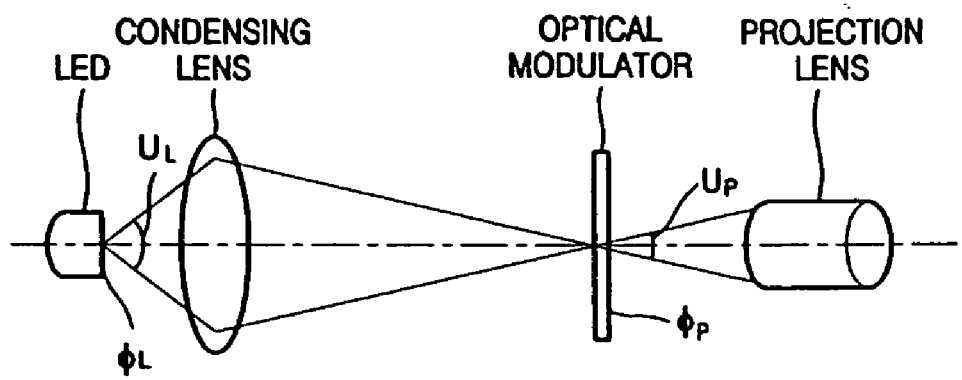
FIGS. 1 and 2 are diagrams for explaining degradation in efficiency of light utilization due to the use of a lens in conventional projection systems.
Figure 2:
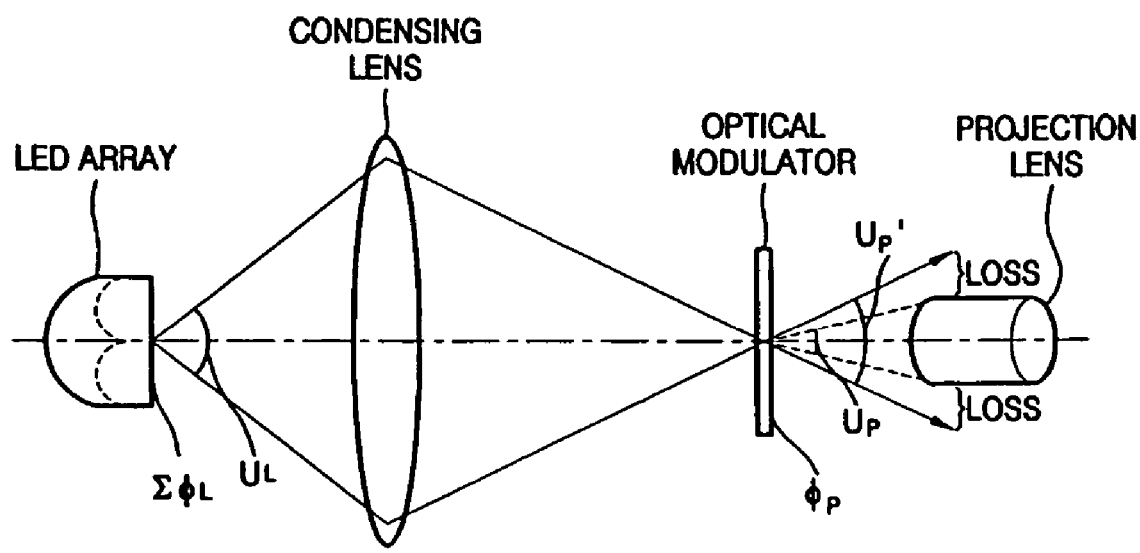

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
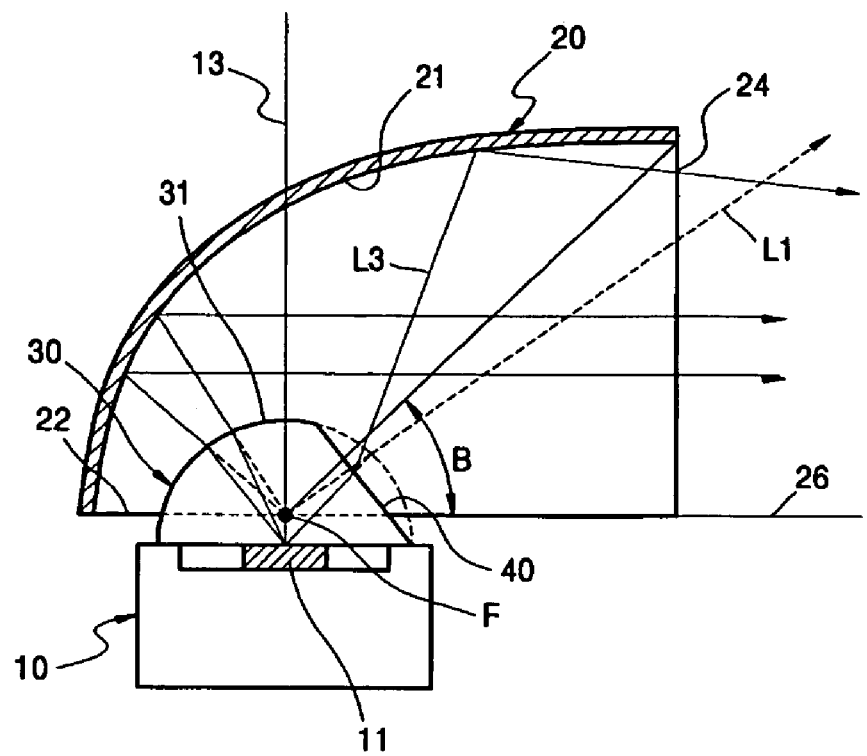
FIG. 3 is a cross-sectional view illustrating an illuminating unit according to an embodiment of the present general inventive concept.

FIG. 3 illustrates an illumination unit according to an embodiment of the present general inventive concept. Referring to FIG. 3, the illuminating unit includes a light source 10 and a reflector 20. The reflector 20 includes a reflecting surface 21, an incident portion 22, and an exit portion 24. The incident portion 22 and the exit portion 24 face the reflecting surface 21 from different directions and intersect with each other. The reflecting surface 21 has a parabolic shape, which can be an aspherical surface with a conic coefficient K ranging from −0.4 to −2.5, and possibly from −0.7 to −1.6. The conic coefficient K of the reflecting surface 21 can be selected within the above ranges to collimate a beam emitted from the light source 10 at a radiation angle to effectively illuminate an object. Hereinafter, an example of the reflecting surface 21 having a conic coefficient K of −1 will be described.

The light source 10 includes at least one LED (light emitting diode) 11 and emits a beam onto the reflecting surface 21 through the incident portion 22. The light source 10, i.e., the LED 11, may be located at the focal point F of the reflecting surface 21 to increase collimation effect of the reflecting surface 21, but is not limited thereto. For example, because of restrictions, such as the geometry of the light source 10 or the reflector 20, the light source 10 may be disposed away from the focal point F of the reflecting surface 21, as illustrated in FIG. 3.

To compensate for deviation of the light source 10 from the focal point F of the reflecting surface 21, the illuminating unit further includes a light source deviation compensator that allows an image of the light source 10 to be focused onto the focal point F. As an example, the illustration unit illustrated in FIG. 3 includes a light-transmissive lens 30 as the light source deviation compensator. A beam emitted from the light source 10 passes through the light-transmissive lens 30 and is incident onto the reflecting surface 21. A surface 31 of the light-transmissive lens 30 can be spherical or aspherical such that extensions (indicated by dotted lines of FIG. 3) of beams incident on the reflecting surface 21 converge at the focal point F. Due to the above-described construction of the light-transmissive lens 30, it is possible to achieve a similar effect as when the light source 10 is located at the focal point F of the reflecting surface 21. The beam is then reflected from the reflecting surface 21, is collimated into a beam substantially parallel to a principal axis 26 of the reflecting surface 21, and radiates from the exit portion 24. Since the light source 10 can be a surface light source rather than a point light source, "substantially parallel" means all beams may not emanate from the focal point F and therefore, the beams may not be completely parallel. While it is illustrated in FIG. 3 that an optical axis 13 of the light source 10 is substantially orthogonal to the principal axis 26 of the reflecting surface 21, the optical axis 13 may be oriented in an alternative fashion.

Among the beams radiating from the light-transmissive lens 30, a beam L1 with a smaller radiation angle than an angle B of the exit portion 24 is not incident on the reflecting surface 21 but directly radiates from the exit portion 24. Thus, the beam L1 does not undergo collimation. The uncollimated beam L1 suffers loss without being effectively used to illuminate the object, thereby lowering efficiency of light utilization.

Figure 4:
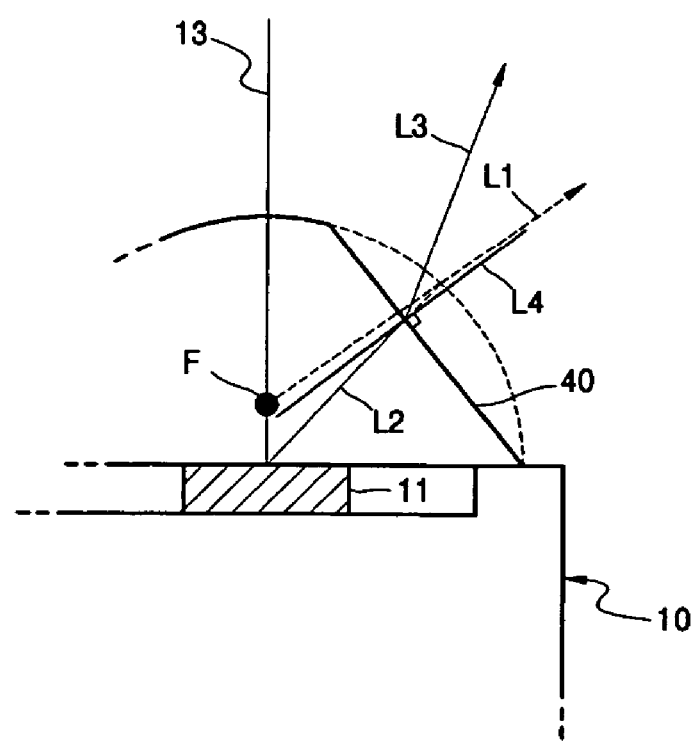
FIG. 4 is a view illustrating operations of a light path changer of the illumination unit of FIG. 3.

To reduce the beam loss, the illuminating unit further includes a light path changer to direct a beam with a radiation angle less than the angle B of the exit portion 24 toward the reflecting surface 21. For example, the light path changer as illustrated in FIG. 3 may include an inclined surface 40 formed by cutting a portion of the light-transmissive lens 30. FIG. 4 illustrates operations of the light path changer (i.e. the inclined surface 40). Referring to FIGS. 3 and 4, a beam L2 emitted from the light source 10 is incident on the light-transmissive lens 30 and then radiates through the inclined surface 40. As illustrated in FIG. 4, due to a refractive index difference between the lens 30 and a medium (air) between the lens 30 and the reflecting surface 21, the beam L2 is refracted and changed in its path as it passes through the inclined surface 40. For example, when the refractive indices of the lens 30 and the air are about 1.5 and 1, respectively, the beam L2 is refracted away from a line L4 normal to the inclined surface 40 and is incident on the reflecting surface 21 as a refracted beam L3. This design increases the amount of light collimated by the reflecting surface 21, thereby improving efficiency of light utilization.

Figure 5:
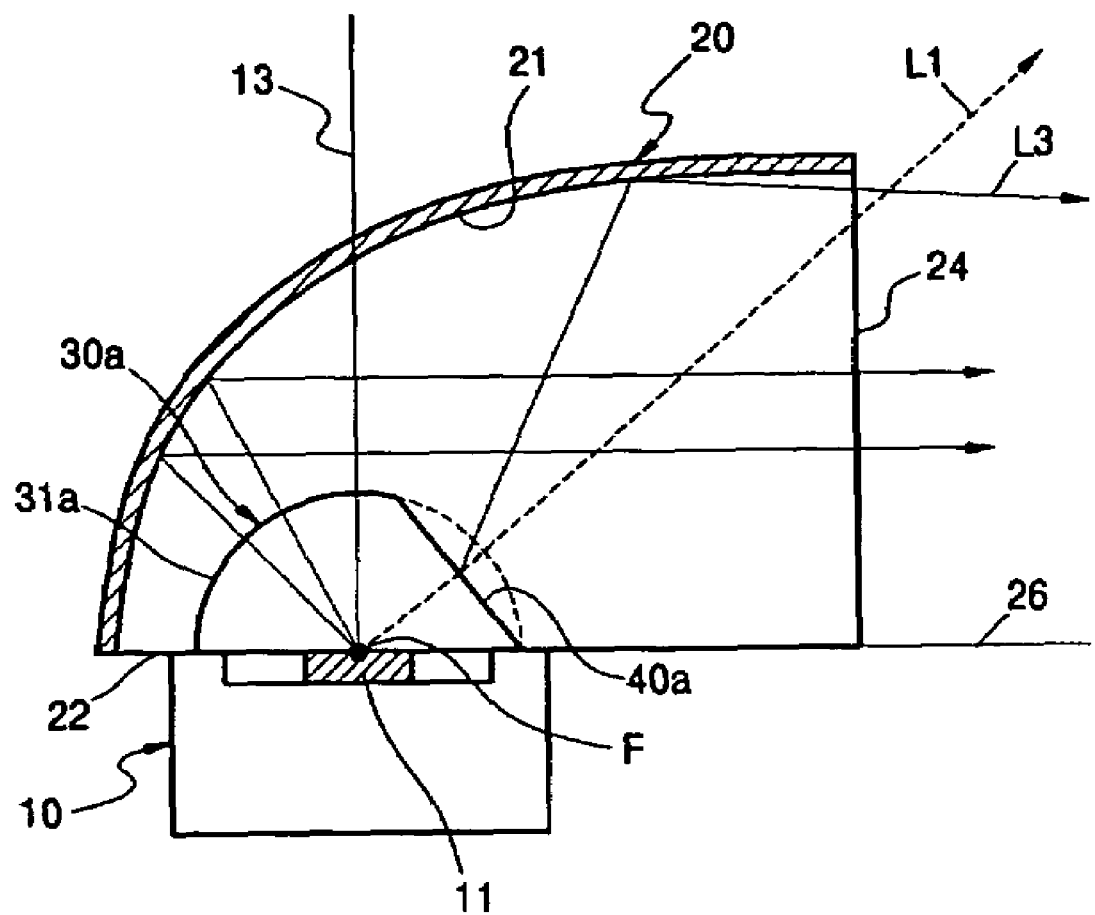
FIG. 5 is a cross-sectional view illustrating an illuminating unit according to another embodiment of the present general inventive concept.

FIG. 5 is a cross-sectional view illustrating an illuminating unit according to another embodiment of the present general inventive concept. Referring to FIG. 5, a light source 10 is located at a focal point F of a reflecting surface 21. A lens 30a to compensate for deviation of the light source 10 from the focal point F has a spherical surface 31a with a center positioned at the focal point F. An inclined surface 40a acting as a light path changer is formed by obliquely cutting the lens 30a. Due to the above described design, it is possible to achieve a similar effect as described with reference to FIGS. 3 and 4.

The use of a light source deviation compensator in the illuminating units as described in the embodiments illustrated in FIGS. 3-5 permit flexibility in selecting a wide range of alternative designs. In these various embodiments, a light path changer can be used to improve efficiency of light utilization. Furthermore, the use of the reflecting surface 21 instead of a lens to collimate beams allows efficient collimation of a beam without degrading efficiency of light utilization when the light source 10 includes multiple LEDs. In addition, use of the light source 10 with multiple LEDs allows for the illuminating unit to be more compact than conventional illuminating units.

Figure 6:
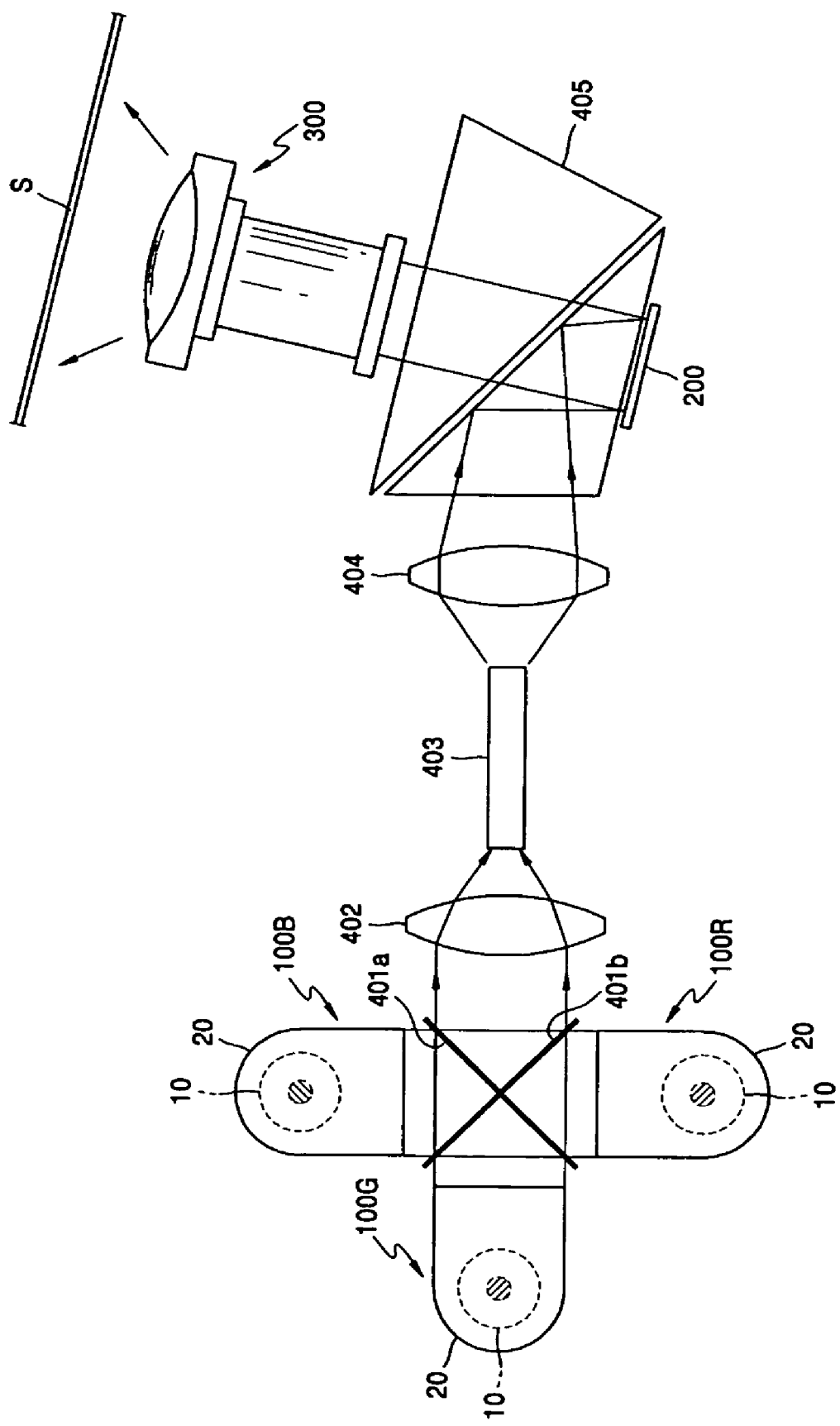
FIG. 6 is a view illustrating an image projection system according to an embodiment of the present invention.

FIG. 6 illustrates an image projection system according to an embodiment of the present general inventive concept. Referring to FIG. 6, the image projection system includes illuminating units 100R, 100G, and 100B, a light modulator 200, and a projection lens unit 300. The illuminating units 100R, 100G, and 100B respectively emit red (R), green (G), and blue (B) beams. Each of the illuminating units 100R, 100G, and 100B has a similar construction to the illumination unit illustrated in FIG. 3 or FIG. 5. The light modulator 200 sequentially modulates the red, green, and blue beams that are sequentially emitted from the 100R, 100G, and 100B according to image data. The projection lens unit 300 can be a single-plate projector and the reflective light modulator 200 can be a single reflective light modulator, such as a digital micromirror device (DMD) or the like.

The red, green, and blue beams sequentially emitted from the illuminating units 100R, 100G, and 100B are guided by first and second dichroic filters 401a and 401b along a common optical path into an integrator 403. As illustrated in FIG. 6, the first dichroic filter 401a reflects the red beam but transmits the remaining beams, and the second dichroic filter 401b reflects the blue beam but transmits the remaining beams. The integrator 403 may be a glass rod with a rectangular cross-section or a light tunnel with an internally reflecting surface and produces surface light with a uniform intensity. A condensing lens unit 402 condenses a beam into the integrator 403. The beam radiating from the integrator 403 passes through a total internal reflection (TIR) prism 405 into the light modulator 200. A relay lens unit 404 enlarges or reduces a size of the beam radiating from the integrator 403 according to an aperture of the light modulator 200. The light modulator 200 sequentially modulates the red, green, and blue beams according to corresponding image data. The modulated beams are reflected back to the TIR prism 405 and then guided by the TIR prism 405 into the projection lens unit 300 which enlarges and projects the modulated beams onto a screen S.

The use of an illuminating unit with a light source deviation compensator in the image projection provides flexibility in designs of the illuminating unit and an image projection system. The use of an illuminating unit with a light path changer improves efficiency of light utilization. Furthermore, using a parabolic reflecting surface to collimate beams reduces or prevents optical loss when a light source includes multiple LEDs, thereby improving the brightness of an image projection system. In addition, use of a light source with multiple LEDs makes an image projection system more compact than conventional image projection systems.

The embodiments of the present general inventive concept compact illuminating units and an image projection system with improved efficiency of light utilization.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illuminating unit comprising:
   a reflector including a parabolic reflecting surface portion and an incident portion and an exit portion intersecting with each other;
   a light source to emit a beam onto the reflecting surface through the incident portion;
   a light source deviation compensator disposed between the reflector and the light source to focus an image of the light source to a focal point of the reflecting surface; and
   a light path changer to direct at least a portion of a beam being emitted from the light source directly to the exit portion toward the reflecting surface.

2. The illuminating unit of claim 1, wherein the light source is positioned at the focal point of the reflecting surface, and the light source deviation compensator comprises a spherical lens with a center positioned at the focal point of the reflecting surface.

3. The illuminating unit of claim 2, wherein the light path changer comprises an inclined surface formed by obliquely cutting a portion of the spherical lens facing the exit portion.

4. The illuminating unit of claim 1, wherein an optical axis of the light source is orthogonal to a principal axis of the reflecting surface.

5. The illuminating unit of claim 1, wherein the reflecting surface comprises an aspherical surface with a conic coefficient K of −0.4 to −2.5.

6. The illuminating unit of claim 1, wherein the light source comprises at least one light-emitting diode (LED).

7. An illumination unit to collimate beams of light emitting from a light source, comprising:
   a reflecting surface to reflect beams emitted from the light source and incident on the reflecting surface through an exit portion of the illumination unit;
   a light source deviation compensator to compensate for deviation of the light source from a focal point of the reflecting surface; and
   a light path changer to refract beams emitted from the light source and not directed toward the reflecting surface such that the refracted beams are incident on and reflected by the reflecting surface.

8. The illumination unit of claim 7, wherein the light source deviation unit comprises:
   a light-transmissive lens provided around the focal point of the reflecting surface to pass the beams emitted from the light source therethrough such that extensions of the beams passing therethrough converge at the focal point of the reflecting surface.

9. The illumination unit of claim 8, wherein the light path changer comprises:
   an inclined surface formed at a portion of the light-transmissive lens.

10. The illumination unit of claim 7, wherein the light source deviation unit comprises:
    a spherical lens having a center disposed at the focal point of the reflecting surface such that extensions of beams passing therethough converge at the focal point of the reflecting surface.

11. The illumination unit of claim 10, wherein the light path changer comprises:
    an obliquely cut portion of the spherical lens.

12. The illumination unit of claim 7, wherein the light source deviation compensator and the light path changer are integrally formed.

13. The illumination unit of claim 7, wherein the reflecting surface reflects the beams through the exit portion such that the reflected beams are substantially parallel with respect to a principal axis of the reflecting surface.

14. An illumination unit comprising:
    a reflector including a parabolic reflecting surface portion, a light exit portion, and a light receiving portion;
    a light source to emit light beams onto the parabolic surface through the light receiving portion; and
    a deviation compensation unit disposed between the light source and the reflecting surface and having a first portion to focus the light beams emitted from the light source at the light receiving portion to a focal point of the reflecting surface and a second portion to refract a portion of the light beams not directed toward the reflecting surface toward the reflecting surface.

15. The illumination unit of claim 14, wherein the second portion comprises an inclined surface formed within the first portion.

16. An image projection system including a plurality of illuminating units to emit a plurality of beams, a light modulator to sequentially modulate the plurality of beams emitted from the plurality of illuminating units according to image data, and a projection lens unit to enlarge and project the plurality of beams radiating from the light modulator, wherein each of the plurality of illuminating units comprises:

a reflector including a parabolic reflecting surface portion and an incident portion and an exit portion intersecting with each other;

a light source to emit a beam onto the reflecting surface through the incident portion;

a light source deviation compensator disposed between the reflector and the light source to focus an image of the light source to a focal point of the reflecting surface; and a light path changer to direct at least a portion of a beam being emitted from the light source directly to the exit portion toward the reflecting surface.

17. The system of claim 16, wherein the light source is positioned at the focal point of the reflecting surface, and the light source deviation compensator comprises a spherical lens with a center positioned at the focal point of the reflecting surface.

18. The system of claim 17, wherein the light path changer comprises an inclined surface formed by obliquely cutting a of the spherical lens facing the exit portion.

19. The system of claim 16, wherein an optical axis of the light source is orthogonal to a principal axis of the reflecting surface.

20. The system of claim 16, wherein the reflecting surface comprises an aspherical surface with a conic coefficient K of −0.4 to −2.5.

21. The system of claim 16, wherein the light source comprises at least one light-emitting diode (LED).

22. An image projection system, comprising:

one or more light sources to emit beams of light of predetermined wavelengths;

one or more reflecting units corresponding to the one or more light sources, each reflecting unit including a reflecting surface to reflect and collimate the beams of light emitted from the respective light source, a light source deviation compensator to compensate for deviation of the respective light source from the focal point of the reflecting surface, and a light path changer to adjust a path of beams of light emitted from the respective light source within a predetermined angle range such that all of the beams of light emitted from the respective light source are reflected and collimated by the reflecting surface;

a light modulator to modulate the collimated beams of light; and a projection unit to enlarge and project the modulated beams of light.

* * * * *